( 12 ) United States Patent
Chan et al.

(10) Patent No.: US 9,276,980 B2
(45) Date of Patent: Mar. 1, 2016

(54) DATA SYNCHRONIZATION BASED ON FILE SYSTEM ACTIVITIES

(71) Applicant: NEXTBIT SYSTEMS INC., San Francisco, CA (US)

(72) Inventors: Michael A. Chan, San Francisco, CA (US); Justin Quan, San Francisco, CA (US); Michael K. Fleming, San Francisco, CA (US)

(*) Notice: Subject to any disclaimer, the term of this patent is extended or adjusted under 35 U.S.C. 154(b) by 317 days.

(21) Appl. No.: 14/044,605

(22) Filed: Oct. 2, 2013

(65) Prior Publication Data

US 2014/0101103 A1  Apr. 10, 2014

Related U.S. Application Data

(60) Provisional application No. 61/708,794, filed on Oct. 2, 2012.

(51) Int. Cl.

| | |
|---|---|
| *G06F 17/30* | (2006.01) |
| *H04L 29/06* | (2006.01) |
| *H04L 29/08* | (2006.01) |
| *H04L 12/26* | (2006.01) |
| *H04L 9/08* | (2006.01) |
| *H04L 9/32* | (2006.01) |
| *G06F 9/44* | (2006.01) |
| *G06F 9/445* | (2006.01) |
| *H04W 8/24* | (2009.01) |

(52) U.S. Cl.
CPC *H04L 65/60* (2013.01); *G06F 8/62* (2013.01); *G06F 8/63* (2013.01); *G06F 9/4406* (2013.01); *G06F 9/4416* (2013.01); *G06F 17/3007* (2013.01); *G06F 17/3015* (2013.01); *G06F 17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01); *G06F 17/30286* (2013.01); *Y02B 60/188* (2013.01)

(58) Field of Classification Search
CPC .................................................. G06F 17/30575
USPC ........................................................ 707/634
See application file for complete search history.

(56) References Cited

U.S. PATENT DOCUMENTS 8,825,815 B2 * 9/2014 Gidron ................ H04L 67/1095
709/221
2009/0319586 A1* 12/2009 Clifton .................. G06F 3/0605

(Continued)

OTHER PUBLICATIONS

Zhang et al., Cloud computing: state-of-the-art and research challenges, 2010, 12 pages.*

*Primary Examiner* — Noosha Arjomandi

(57) ABSTRACT

Technology is disclosed herein for data synchronization based on file system activities. According to at least one embodiment, a computing device monitors one or more file system operations for a file stored in the computing device. The computing device records the file system operations for the file sequentially into a log data structure. The computing device synchronizes the file with a server by sending the log data structure to the server. The server can apply the file system operations recorded in the log data to an instance of the file stored in the server such that data of the file stored in the computing device are consistent with data in the instance of the file stored in the server after the file system operations are applied.

30 Claims, 7 Drawing Sheets

(56) References Cited

U.S. PATENT DOCUMENTS

| | | | |
|---|---|---|---|
| 2010/0257244 A1* | 10/2010 | Ragavan | H04L 67/1095 709/206 |
| 2012/0054153 A1* | 3/2012 | Dickgiesser | G06F 17/30575 707/623 |
| 2012/0209909 A1* | 8/2012 | Huang | G06Q 30/02 709/204 |
| 2014/0006357 A1* | 1/2014 | Davis | G06F 11/1464 707/667 |
| 2014/0040572 A1* | 2/2014 | Kotagiri | G06F 3/0619 711/159 |

* cited by examiner

DATA SYNCHRONIZATION BASED ON FILE SYSTEM ACTIVITIES

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile devices, and more particularly, to mobile devices capable of synchronizing data with a cloud server based on file system activities.

BACKGROUND

A computing device can synchronize its data with another device which maintain a mirror copy of the data. The process of data synchronization establishes consistency among the data from the these two devices. One example of data synchronization is file synchronization.

One way to synchronize two files from different devices is to transfer the entire file to another device so that the files can be compared locally. But this method may waste network bandwidth for transferring portions of the file that are identical to the counterparts of the other file. Another way of file synchronization is to determine which portion of a file is different from another file and only transfer the different portion. A first device can split a first file into fixed-size non-overlapping chunks and compute checksums for each chunk. The first device sends the checksums of the first file to a second device. Similarly, the second device can split a second file into fixed-size non-overlapping chunks and compute checksums for each chunk of the second file. The second device then compares the received checksums of the first file with the checksums of the second file. If any of the checksums of the first file do not match their counterpart checksums of the second file, the second device detects a data chunk containing a difference between the first and second files. In order to synchronize the data from the first and second files, the first device only needs to send data chunks that are identified as containing the difference.

Such a method still requires reading all portions of the file in order to generate the checksums. The process of generating the checksums can be expensive if the file size is large.

SUMMARY

Technology introduced herein provides a mechanism for data synchronization based on file system activities. According to at least one embodiment, a computing device monitors one or more file system operations for a file stored in the computing device. The computing device records the file system operations for the file sequentially into a log data structure. (Alternatively, a log data structure can also record file system operations to multiple files.) The computing device synchronizes the file with a server by sending the log data structure to the server. The server can apply the file system operations recorded in the log data to an instance of the file stored in the server such that data of the file stored in the computing device are consistent with data in the instance of the file stored in the server after the file system operations are applied.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
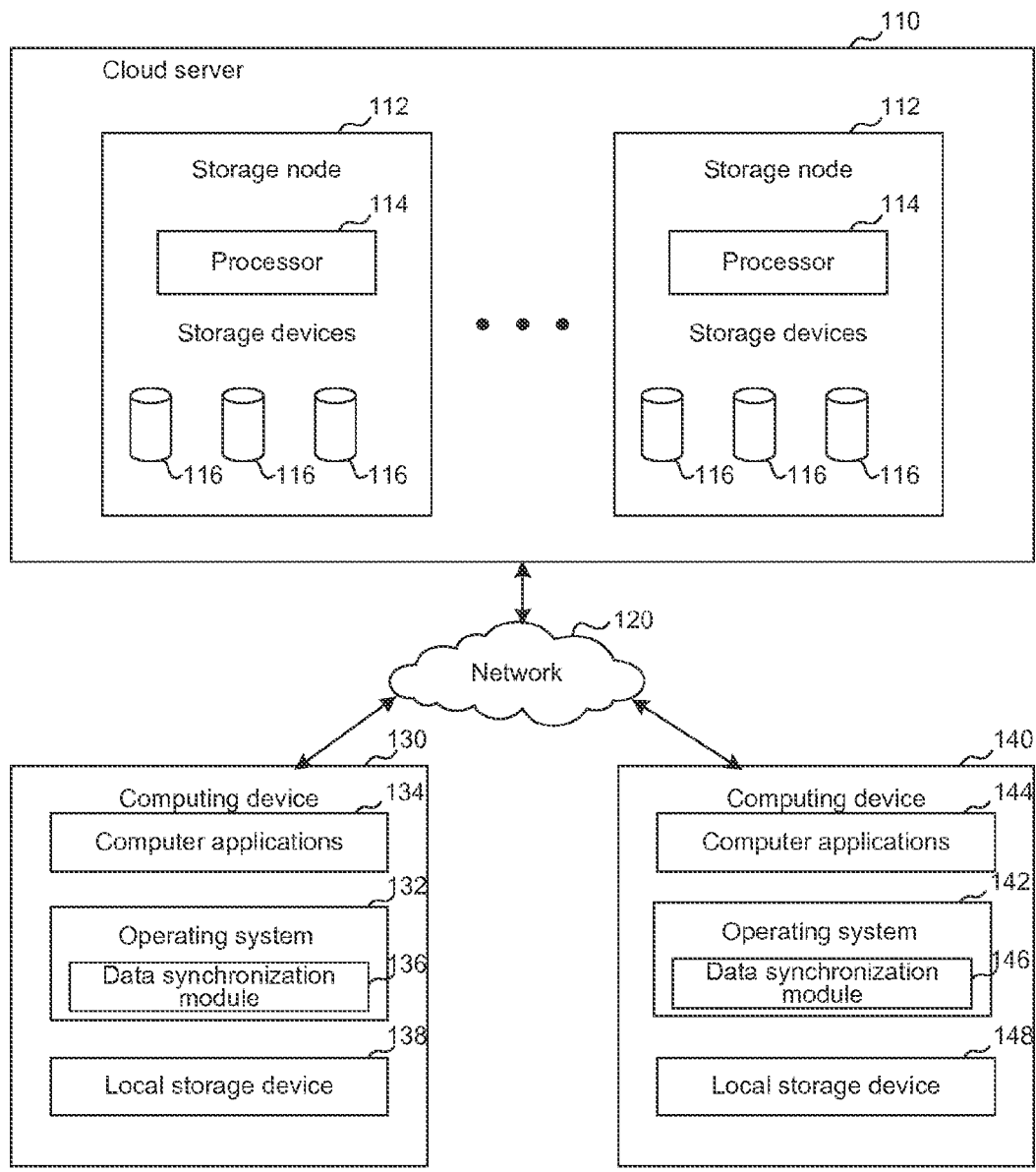
FIG. 1 illustrates an example system for computing devices connected to a cloud server for data synchronization based on file system activities.

FIG. 1 illustrates an example system for computing devices connected to a cloud server for data synchronization based on file system activities. The system includes a cloud server 110 configured to communicate with the computing devices. In one embodiment, the cloud server 110 can be a server cluster having computer nodes interconnected with each other by a network. The cloud server 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 130 and 140 can each communicate with the cloud server 110 via network 120. The network 120 can be, e.g., the Internet. Although FIG. 1 illustrates two computing devices 130 and 140, a person having ordinary skill in the art will readily understand that the technology disclosed herein can be applied to a single computing device or more than two computing devices connected to the cloud server 110.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 can include a data synchronization module 136 to synchronize the data of the computing device 130 with the cloud server 110. The data synchronization module 136 may continuously monitor the file system of the computing device 130 and synchronize any newly generated data for the device 130 in real time.

In at least one embodiment, the data synchronization module 136 monitors the file system operations by the file system of the computing device 130. The data synchronization module 139 captures the file system operations and records them as a sequential list of file system changes in a log data structure. The log data structure can be implemented as, e.g., a log file or a log database. Alternatively, the log data structure can be implemented as part of metadata of the file to be changed. For each file, the data synchronization module 136 can maintain a separate log data structure for recording file system operations to the individual file. Alternatively, the data synchronization module 136 can maintain a centralized log data structure for recording file system operations to multiple files of the computing device 130.

Instead of sending the file over, the data synchronization module 136 can send the log data structure to the cloud server 110 for the purpose of file synchronization. The cloud server 110 can examine the log data structure to determine whether a copy of the file stored in the cloud server has been synchronized. For instance, if the log data structure includes no further file system operation to the file, the cloud server 110 can determine that the cover of the file stored in the cloud server is up to date. If the log data structure includes new file system operations to the file, the cloud server 110 can synchronize the file data by applying the new file system operations to the version of the file stored in the cloud server 110.

Figure 2:
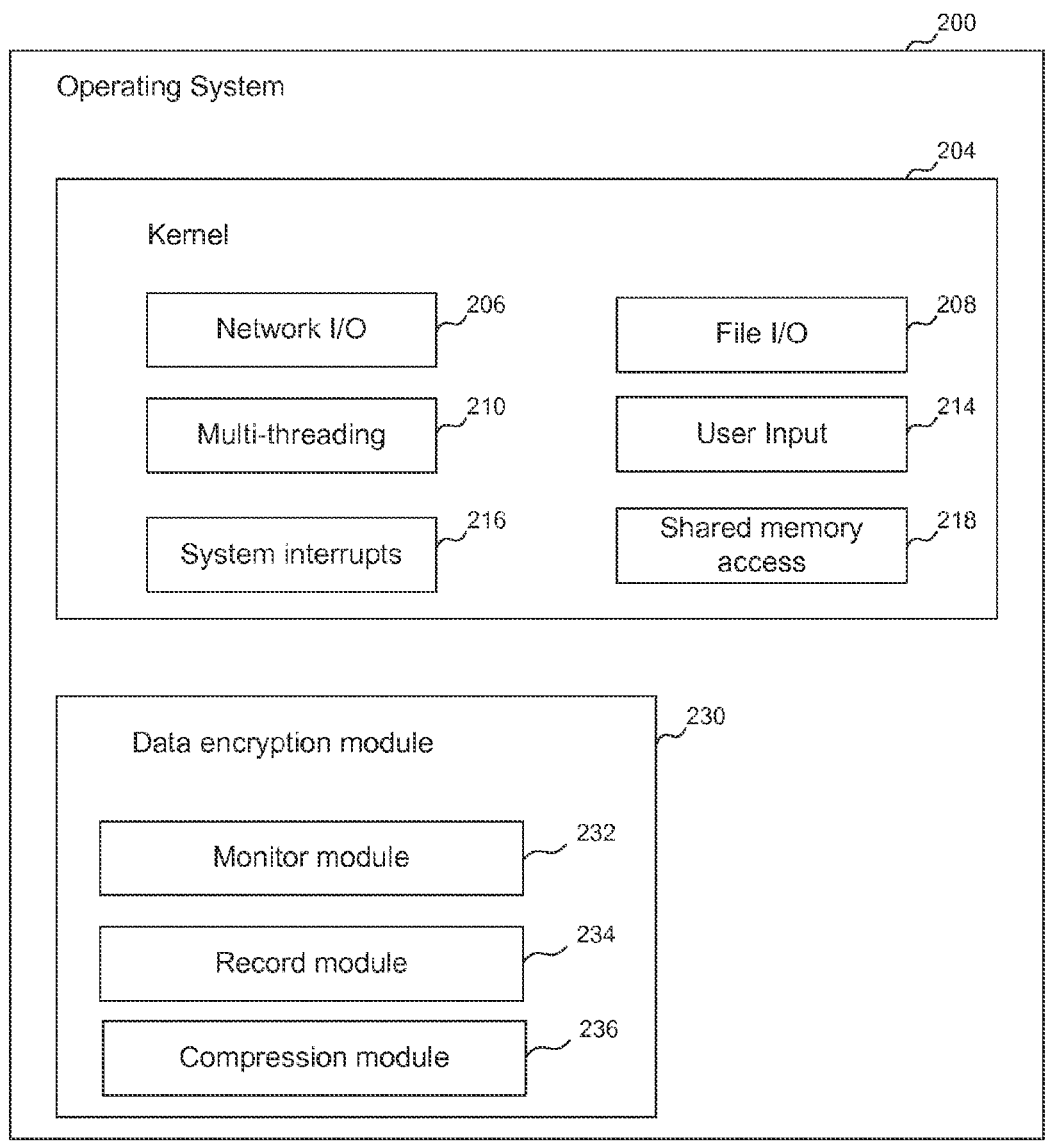
FIG. 2 illustrates an example operating system of a computing device for data synchronization.

FIG. 2 illustrates an example operating system of a computing device for data synchronization, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A data synchronization module 230 can run on top of the kernel 204. Alternatively the kernel 204 can be modified to include the data synchronization module 230. The data synchronization module 230 includes a monitor module 232 and a record module 234. The monitor module 232 can be implemented as a service running at the background of the operation system 200 to monitor file system operations to the files stored in the device. The record module 234 is responsible for organizing and recording the file system operations into a log data structure. For instance, the record module 234 may organize and record the file system operations in an order of timestamps into the log data structure.

The data synchronization module 230 may further include a compression module 236. The compression module 236 is responsible for compressing the log data structure for reducing the size of the log data structure before sending it over the network. For instance, the compression module 236 may use a binary compression format to further reduce the size of the log data structure.

Figure 3:
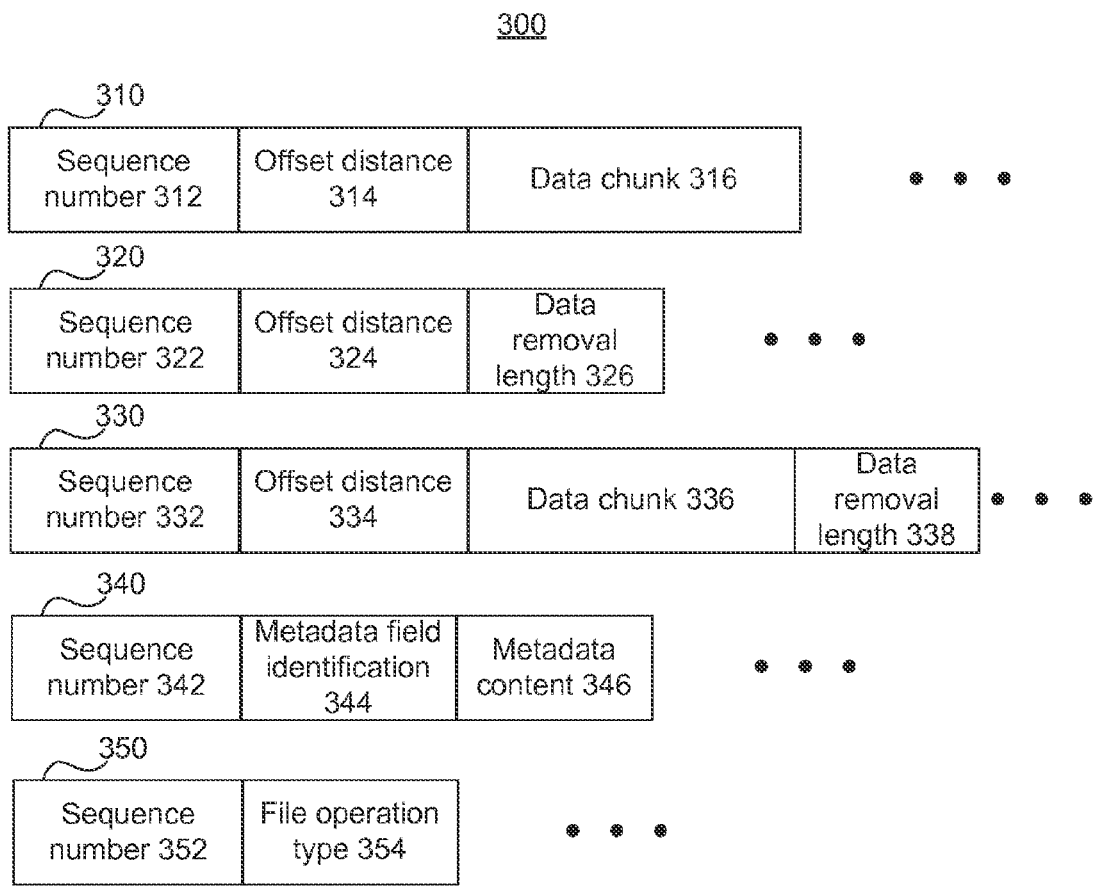
FIG. 3 illustrates an example of a log file recording various types of file system operations.

The log data structure, e.g. a log file, can record different types of file system operations for modifying content data or metadata of a file. FIG. 3 illustrates an example of a log file recording various types of file system operations. The log file 300 includes multiple data portions 310-350. Each of the data portions 310-350 can have different sizes.

Some of the data portions 310-350 contain information representing file system operations for changing the content data of the file. For instance, the log file 300 includes a data portion 310 representing a data write operation. The data portion 310 includes a sequence number 312, an offset distance 314 and a data chunk 316. The sequence number 312 indicates the relative position of the data write operation in a sequence of file system operations. For instance, the sequence numbers for the data portions may be assigned such that a file system operation associated with a smaller sequence number should be applied to the file before another file system operation associated with a lager sequence number is applied to the file.

Alternatively, the log file 300 can include data other than the sequence numbers for determining the operation order. For instance, the log file 300 may record the timestamps of the file system operations.

The offset distance 314 indicates the distance between the beginning of the file and the position where the new data content should be inserted. The offset distance may be measured in terms of, e.g., number of data blocks. The data chunk 316 contains the new content data to be inserted into the file for the data write operation.

The log file 300 includes another data portion 320 representing a data removal operation. The data portion 320 includes a sequence number 322, an offset distance 324 and a data removal length 326. The offset distance 324 indicates the distance between the beginning of the file and the position where a certain length of data should be removed according to the data removal length 326. The offset distance may be measured in terms of, e.g., number of data blocks. The data removal length 326 indicates the length of the data to be removed (e.g., in terms of data blocks).

A data replacement operation can be represented by a combination of a data write operation and a data removal operation. Alternatively, a data portion representing a data replacement operation can be recorded in the log file as a single operation as well. Such a data portion 330 can include a sequence number 332, an offset distance 334, a data chunk 336 and a data removal length 338. The application of the data replacement operation can involve, e.g., insertion of the data chunk 336 at the offset distance 334 of the file, as well as removal of data of a length 338 after the inserted data chunk 336 from the file.

The log file 300 further includes a data portion 340 representing a metadata change operation. The data portion 340 includes a sequence number 342, metadata field identification 344 and a metadata content 346. The sequence number 342 is useful to determine the timing of applying the metadata change operation. For example, a file name change may have to be applied to a file after the data content of the file is changed.

The metadata field identification 344 identifies which metadata is going to be changed. The metadata field identification 344 may contain, e.g., the name of the metadata field. For instance, the metadata field identification 344 may include the metadata field of file name, indicating that the file name is going to be changed. Alternatively, the metadata field identification 344 may include the metadata field of read access right, indicating the read access right is going to be changed for one or more user accounts. The metadata content 346 includes the new metadata content. For instance, the metadata content 346 may include a new file name or a new file access data structure defining the file access rights for different user groups.

The log file 300 may include file level operations such as file delete operations or file create operations. As illustrated in FIG. 3, the log file 300 further includes a data portion 350 representing a file delete operation. The data portion 350 includes a sequence number 352 and file operation type 354. The file operation type 354 can be, e.g., deletion.

Figure 4:
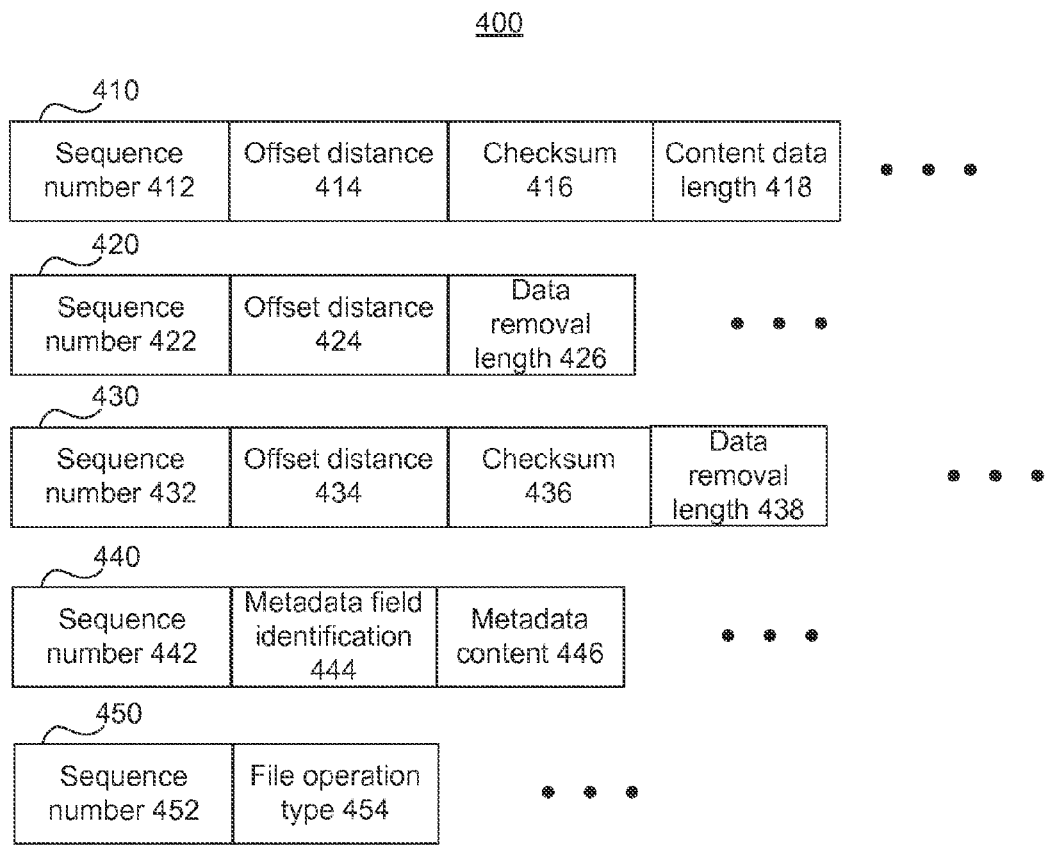
FIG. 4 illustrates another example of a log file recording various types of file system operations.

FIG. 3 illustrates a log file 300 includes a data portion 310 representing a data write operation. The data portion 310 representing the data write operation includes the new content data to be written into the file. Alternatively, a log file or a log data structure can include a checksum of the new content data, instead of the new content data. FIG. 4 illustrates another example of a log file recording various types of file system operations.

The log file 400 includes a data portion 410 representing a data write operation. The data portion 410 includes a sequence number 412, an offset distance 414, a checksum 416 and a content data length 418. The offset distance 414 indicates the distance between the beginning of the file and the position where the new data content should be inserted. The offset distance may be measured in terms of, e.g., number of data blocks.

The checksum 416 is generated from the new content data to be written to the file according to the data write operation. The checksum 416 is calculated based on the new content data for the purpose of identifying the content. The checksum 416 can be generated using different methods, e.g., parity words, modular sum, position dependence. Hash values using, e.g. MD5, SHA-1 or SHA-256 methods, can be also generated as the checksum 416. The content data length 418 indicates the length of the new content data (e.g., in terms of data blocks). The new content data can be stored as, e.g., a file or a data structure separate from the log file 400.

The log data structure also includes a data portion 430 representing a data replacement operation. The data portion 430 includes a sequence number 432, an offset distance 434, a checksum 436 and a data removal length 438. Unlike the data chunk 336 (including new content data) of data portion 330 as illustrated in FIG. 3, the data portion 430 includes a checksum 436 instead. The checksum 436 is generated from the new content data of the data replacement operation. The application of the data replacement operation can involve, e.g., insertion of the new content data associated with the checksum 436 at the offset distance 434 of the file, as well as removal of data of a length 438 after the inserted new content data from the file.

The log file 400 may also include file level operations such as file delete operations or file create operations. As illustrated in FIG. 4, the log file 400 further includes a data portion 450 representing a file level operation. The data portion 450 includes a sequence number 452 and file operation type 454. The file operation type 454 can be, e.g., deletion or creation (e.g., creating a file having an initial size of zero bytes).

Figure 5:
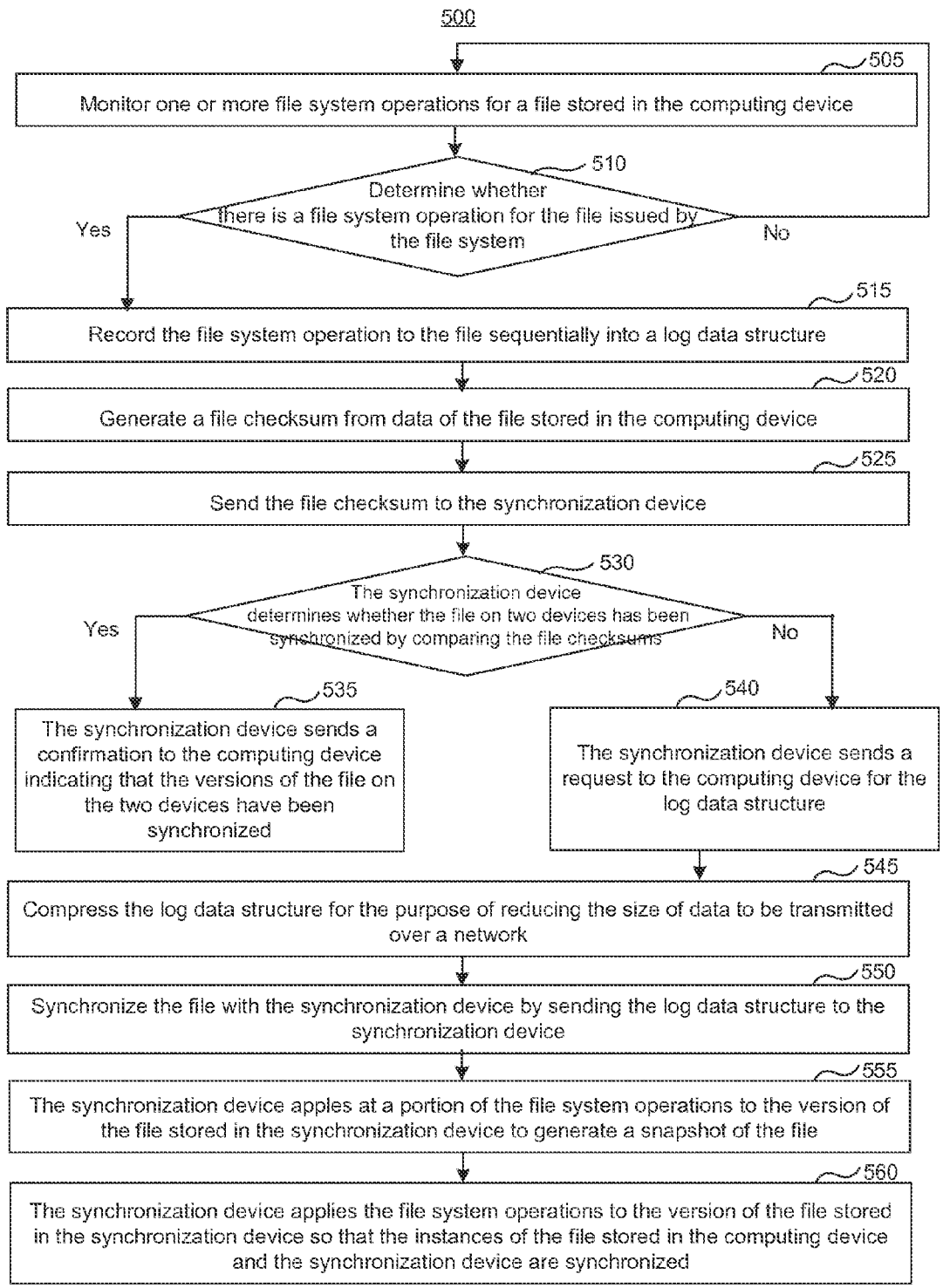
FIG. 5 illustrates an example of a process for data synchronization based on file system activities.

For file synchronization, the computing device sends a log data structure to a cloud server. The cloud server synchronizes the file by applying the file system operations of the log data structure to a version of the file stored in the cloud server, if that version of the file is not up to date yet. FIG. 5 illustrates an example of a process 500 for data synchronization based on file system activities. The process 500 starts at step 505, where a computing device monitors one or more file system operations for a file stored in the computing device.

At step 510, the computing device determines whether there is a file system operation for the file issued by the file system. If there is a file system operation, at step 515, the computing device records the file system operation for the file sequentially into a log data structure. The file system operations can be recorded in the log data structure based on an ordered sequence of the file system operations being applied to the file.

As illustrated in FIG. 3 and FIG. 4, the file system operations recorded in the log data structure can include at least one of a data write operation, a data removal operation, a file delete operation, a file creation operation, a metadata change operation, a file rename operation, a file truncate operation. The log data structure can include an offset distance and a data checksum of new content data for a data write operation. The data checksum is suitable to be used to determine whether another data write operation received by the synchronization device is the same operation as the data write operation. Alternatively, the log data structure can directly contain the new content data.

The file system operations recorded in the log data structure are suitable to be applied to an instance of the file stored in a synchronization device (e.g. a server or another computing device) such that data of the file stored in the computing device are consistent with data in the instance of the file stored in the synchronization device after the file system operations are applied.

A log data structure can record file system operations to more than one files stored in the computing. Alternatively, each file can have its own log data structure. In other words, the file system operations to each of the files are recorded into one of the log data structures.

File checksums may be generated to determine whether the computing device and the synchronization device (e.g. a server or another computing device) have the same version of the file. At step 520, the computing device generates a file checksum from data of the file stored in the computing device, after the file system operations are applied to the file. At step 525, the computing device sends the file checksum to the synchronization device. At step 530, the synchronization device determines whether the file on two devices has been synchronized by comparing the file checksums. If the file has been synchronized, at step 535, the synchronization device can send a confirmation to the computing device indicating that the versions of the file on the two devices have been synchronized. Otherwise, at step 540, the synchronization device sends a request to the computing device for the log data structure.

Optionally, at step 545, the computing device compresses the log data structure for the purpose of reducing the size of data to be transmitted over a network. At step 550, the computing device synchronizes the file with the synchronization device by sending the log data structure to the synchronization device. The synchronization device can be a storage server or another computing device. The log data structure is suitable for determining whether data of the file stored in the computing device are consistent with data in the instance of the file stored in the synchronization device.

At step 555, optionally, the synchronization device may apply at a portion of the file system operations to the version of the file stored in the synchronization device to generate a snapshot of the file. At step 560, the synchronization device applies the file system operations to the version of the file stored in the synchronization device so that the instances of the file stored in the computing device and the synchronization device are synchronized.

Those skilled in the art will appreciate that the logic illustrated in FIG. 5 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the file checksum can be generated before the log data structure is generated.

Figure 6:
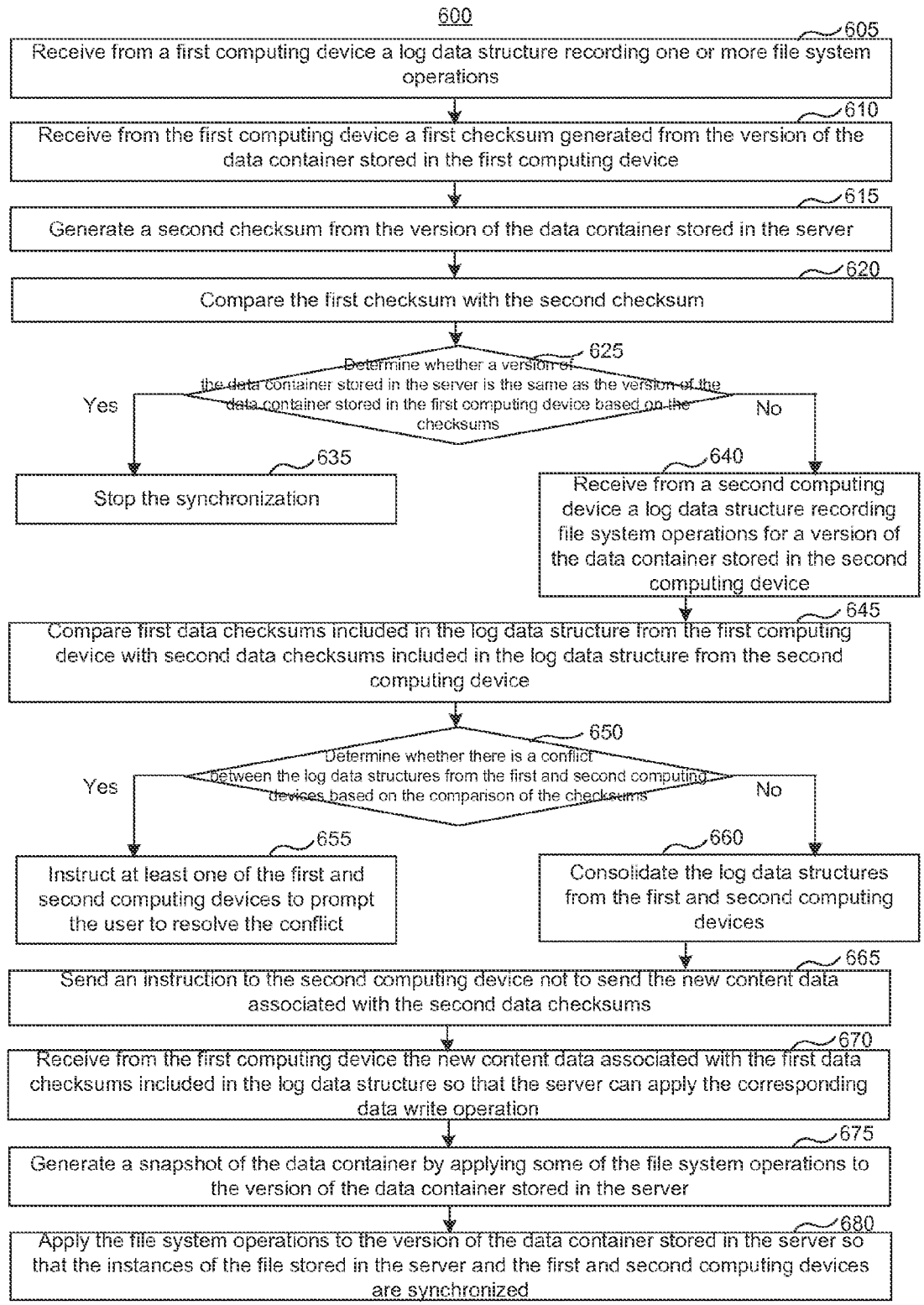
FIG. 6 illustrates an example of a process for data synchronization with multiple devices in a client-server distributed storage system.

The synchronization device or server can further synchronize the version of the file with other connected devices. FIG. 6 illustrates an example of a process 600 for data synchronization with multiple devices in a client-server distributed storage system. The process 600 starts at step 605, where a server receives from a first computing device a log data structure recording one or more file system operations. The file system operations are generated by the first computing device to be applied to a version of the data container stored in the first computing device. A data container can be, a file or other types of structures organizing data.

Optionally, the server may use file checksums to determine whether the versions of the file have been synchronized already. At step 610, the server receives from the first computing device a first checksum generated from the version of the data container stored in the first computing device. At step 615, the server generates a second checksum from the version of the data container stored in the server. At step 620, the server compares the first checksum with the second checksum. At step 625, the server determines whether a version of the data container stored in the server is the same as the version of the data container stored in the first computing device based on the checksums.

If the two versions are the same, at step 630, the server stops the synchronization. Otherwise, at step 635, the server synchronizes the data container by applying the file system operations to the version of the data container stored in the server.

The server can further receive log data structure from other connected computing device. At step 640, the server receives from a second computing device a log data structure recording file system operations for a version of the data container stored in the second computing device.

At step 645, the server compares first data checksums included in the log data structure from the first computing device with second data checksums included in the log data structure from the second computing device. The first data checksums are generated from new content data for data write operations recorded in the log data structure from the first computing device. Similarly, the second data checksums are generated from new content data for data write operations recorded in the log data structure from the second computing device.

Alternatively, if the log data structures contain new content data instead of the data checksums, the server can directly compares the new content data included in the log data structures sent by the first and second computing devices.

At step 650, the server determines whether there is a conflict between the log data structures from the first and second computing devices based on the comparison of the checksums. If there is a conflict, at step 655, the server may instruct at least one of the first and second computing devices to prompt the user to resolve the conflict, e.g., in a way illustrated in U.S. patent application Ser. No. 14/042,398, which is incorporated by reference herein in its entirety.

If there is no conflict, at step 660, the server consolidates the log data structures from the first and second computing devices. At step 665, the server sends an instruction to the second computing device not to send the new content data associated with the second data checksums. At step 670, the server receives from the first computing device the new content data associated with the first data checksums included in the log data structure so that the server can apply the corresponding data write operation. Alternatively, the server can retrieve the new content data from the second computing device and instruct the first computing device not to send the redundant content data.

At step 675, optionally, the server can generate a snapshot of the data container by applying some of the file system operations to the version of the data container stored in the server. At step 680, the server applies the file system operations to the version of the data container stored in the server so that the instances of the file stored in the server and the first and second computing devices are synchronized.

Storing the snapshots and the synchronized version of the file, the server may choose to remove the log data structure. However, the server may decide continue keeping the log data structure based on the versions of the file stored in other connected devices. For instance, if the server is aware that one connected device still stores a version of the file older than the current synchronized version, the server may keep the log data structure so that the file system operations of the log data structure can be transmitted to that connected device and applied to that older version of the file, for the purpose of data synchronization.

Figure 7:
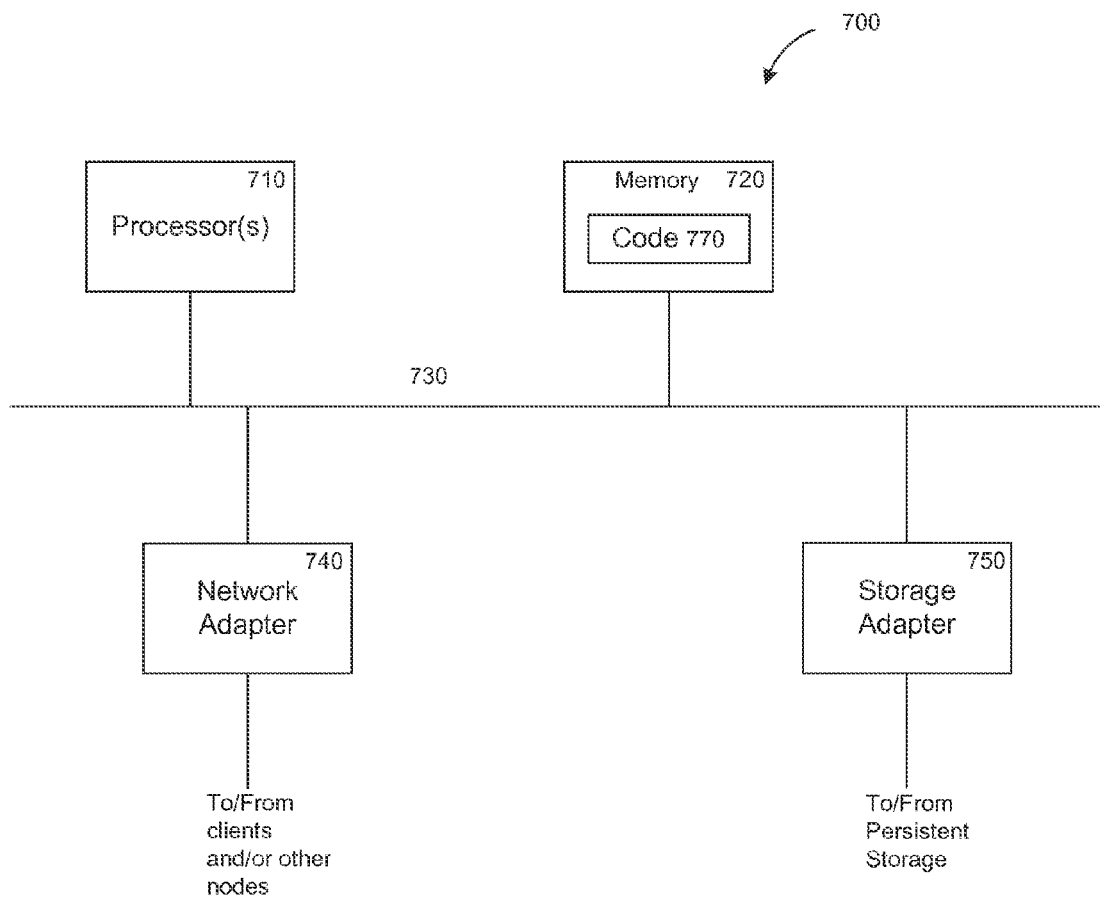
FIG. 7 is a high-level block diagram showing an example of the architecture of a computer, which may represent any computing device or server described herein.

FIG. 7 is a high-level block diagram showing an example of the architecture of a computer 700, which may represent any computing device or server described herein. The computer 700 includes one or more processors 710 and memory 720 coupled to an interconnect 730. The interconnect 730 shown in FIG. 7 is an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the computer 700 and, thus, control the overall operation of the computer 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the computer 700. The memory 720 represents any form of random access memory (RAM), read-only memory (ROM), flash memory, or the like, or a combination of such devices. In use, the memory 720 may contain a code 770 containing instructions according to the technology disclosed herein.

Also connected to the processor(s) 710 through the interconnect 730 are a network adapter 740 and a storage adapter 750. The network adapter 740 provides the computer 700 with the ability to communicate with remote devices, over a network and may be, for example, an Ethernet adapter or Fibre Channel adapter. The network adapter 740 may also provide the computer 700 with the ability to communicate with other computers. The storage adapter 750 allows the computer 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the computer 700 by downloading it from a remote system through the computer 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer implemented method for data synchronization based on file system activities, the method comprising:
    monitoring, at a computing device, one or more file system operations for a file stored in the computing device;
    recording, at the computing device, the file system operations to the file sequentially into a log data structure; and
    synchronizing the file with a synchronization device by sending the log data structure to the synchronization device;
    wherein the file system operations recorded in the log data structure are suitable to be applied to an instance of the file stored in the synchronization device such that data of the file stored in the computing device are consistent with data in the instance of the file stored in the synchronization device after the file system operations being applied;
    wherein the log data structure includes an offset distance and a data checksum of new content data for a data write operation, and the data checksum is suitable to be used to determine whether another data write operation received by the synchronization device is the same operation as the data write operation.

2. The method of claim 1, wherein the log data structure is suitable for determining whether data of the file stored in the computing device are consistent with data in the instance of the file stored in the synchronization device.

3. The method of claim 1, wherein the synchronization device is a storage server or another computing device.

4. The method of claim 1, further comprising: generating, at the computing device, a file checksum from data of the file; and sending the file checksum to the synchronization device, wherein the file checksum is suitable to be compared with a file checksum generated from data of the instance of the file stored in the synchronization device.

5. The method of claim 1, wherein the file system operations are suitable to be applied to the instance of the file stored in the synchronization device to generate a snapshot of a version of the file.

6. The method of claim 1, wherein the file system operations are recorded in the log data structure based on an ordered sequence of the file system operations being applied to the file stored in the computing device.

7. The method of claim 1, wherein the file system operations recorded in the log data structure include at least one of a data write operation, a data removal operation, a file delete operation, a file creation operation, a metadata change operation, a file rename operation, a file truncate operation.

8. The method of claim 1, wherein the log data structure includes an offset distance and a data chunk including new content data for a data write operation.

9. The method of claim 1, wherein the log data structure includes an offset distance and a data removal length for a data removal operation.

10. The method of claim 1, wherein the log data structure include a new file name for a metadata change operation.

11. The method of claim 1, wherein file system operations to multiple files stored in the computing device are monitored and recorded into a log data structure.

12. The method of claim 1, wherein file system operations to multiple files stored in the computing device are monitored, and the file system operations to each of the files are recorded into one of multiple log data structures.

13. The method of claim 1, wherein the log data structure is part of a metadata structure for the file.

14. The method of claim 1, wherein the log data structure is a file or a database.

15. The method of claim 1, further comprising: compressing the log data structure at the computing device.

16. A method for synchronizing data based on file system activities in a client-server distributed storage system, the server comprising:
    receiving, from a first computing device at a server, a log data structure recording one or more file system operations, wherein the file system operations are generated by the first computing device to be applied to a version of the data container stored in the first computing device;
    determining, at the server, whether a version of the data container stored in the server is the same as the version of the data container stored in the first computing device;

synchronizing the data container by applying the file system operations to the version of the data container stored in the server, when the version of the data container stored in the server is not the same as the version of the data container stored in the first computing device;

wherein a data write operation recorded in the log data structure includes an offset distance and a data checksum generated from new content data for the data write operation.

17. The method of claim 16, wherein the log data structure recording file system operations to be applied to multiple data containers stored in the server, and the log data structure includes data container identifications for the file system operations.

18. The method of claim 16, further comprising: receiving, from the first computing device, a first checksum generated from the version of the data container stored in the first computing device; generating, at the server, a second checksum from the version of the data container stored in the server; and wherein the step of determining comprises: comparing the first checksum with the second checksum.

19. The method of claim 16, further comprising: receiving, from a second computing device, a log data structure recording file system operations for a version of the data container stored in the second computing device; determining, at the server, whether there is a conflict between the log data structures from the first and second computing devices; consolidating the log data structures from the first and second computing devices if there is no conflict between the log data structures from the first and second computing devices.

20. The method of claim 19, wherein the step of determining whether there is a conflict comprises: comparing a first data checksum included in the log data structure from the first computing device with a second data checksum included in the log data structure from the second computing device; wherein the first data checksum is generated from new content data for a data write operation recorded in the log data structure from the first computing device, and wherein the second data checksum is generated from new content data for a data write operation recorded in the log data structure from the second computing device.

21. The method of claim 20, further comprising: receiving, from the first computing device, the new content data associated with the first data checksum; and sending an instruction, to the second computing device, not to send the new content data associated with the second data checksum, if the second data checksum equals to the first checksum.

22. The method of claim 16, wherein a data write operation recorded in the log data structure includes an offset distance and a data chunk including new content data for the data write operation.

23. The method of claim 16, further comprising: generating, at the server, a snapshot of a new version of the data container by applying the file system operations to the version of the data container stored in the server.

24. A storage server, comprising:
a processor;
a storage component configured to store a server version of a file;
a networking component configured to receive from a first computing device a log data structure recording one or more file system operations, wherein the file system operations are generated by the first computing device to be applied to a device version of the file stored in the first computing device;
a synchronization module which, when executed by the processor, apply the file system operations recorded in the log data structure to the server version of the file such that after the applying the file system operations, data of the file stored in the storage component of the storage server are the same as data of the file stored in the first computing device;
wherein the file system operations recorded in the log data structure include a data write operation having an offset distance and a data checksum generated from new content data for the data write operation; and
wherein the networking component is further configured to receive the new content data for the data write operation.

25. The storage server of claim 24, wherein the log data structure represents a difference between data of the file stored in the first computing device and data of the file stored in the server.

26. The storage server of claim 24, wherein the file system operations recorded in the log data structure include a data write operation having an offset distance and a data chunk including new content data for the data write operation, or a data removal operation having an offset distance and a data removal length for a data removal operation.

27. The storage server of claim 24, wherein the network component is further configured to receive another log data structure from a second computing device; and wherein the synchronization module is further configured to determine whether the other log data structure is redundant by comparing the file system operations in the log data structure with the file system operations in the other log data structure.

28. The storage server of claim 24, wherein the synchronization module is further configured to determine whether all devices connected to the server that store the file contain the newest version of the file as stored in the server; and wherein the synchronization module is further configured to remove the log data structure if all devices connected to the server that store the file contain the newest version of the file as stored in the server.

29. The storage server of claim 24, wherein the networking component is further configured to send the log data structure to a second computing device such that the file stored in the second computing device can be synchronized with the file stored in the server by applying the file system operations of the log data structure to the file stored in the second computing device.

30. The storage server of claim 24, wherein the synchronization module is further configured to determine whether to send to the second computing device for a file synchronization purpose the log data structure or the file stored in the server, depending on the sizes of the log data structure and the file stored in the server.

* * * * *